United States Patent [19]
Julien, Sr. et al.

[11] 3,921,840
[45] Nov. 25, 1975

[54] PORTABLE CONTAINER EMPTYING APPARATUS

[75] Inventors: Fred E. Julien, Sr., East Peoria; Elmer A. Raithel, Creve Coeur; Carl W. Shafer, Sparland, all of Ill.

[73] Assignee: Caterpillar Tractor Co., Peoria, Ill.

[22] Filed: June 4, 1974

[21] Appl. No.: 476,219

[52] U.S. Cl. .......................... 214/310; 193/35 SS
[51] Int. Cl.² ........................................ B65G 65/04
[58] Field of Search .......... 214/309, 310, 311, 301, 214/84; 193/35 SS

[56] References Cited
UNITED STATES PATENTS
3,578,184  5/1971  Schaich ........................ 214/310
3,675,801  7/1972  Larson et al. ................. 214/310

FOREIGN PATENTS OR APPLICATIONS
101,107  2/1965  Denmark .................... 193/35 SS

*Primary Examiner*—Robert J. Spar
*Assistant Examiner*—Lawrence J. Oresky
*Attorney, Agent, or Firm*—Phillips, Moore, Weissenberger Lempio & Strabala

[57] ABSTRACT

An open-sided container comprises a bottom wall having a plurality of openings formed therethrough each adapted to receive a roller therein when the container is placed on a support. The rollers project through the openings to lift and support articles retained in the container during removal thereof.

13 Claims, 3 Drawing Figures

U.S. Patent  Nov. 25, 1975  3,921,840
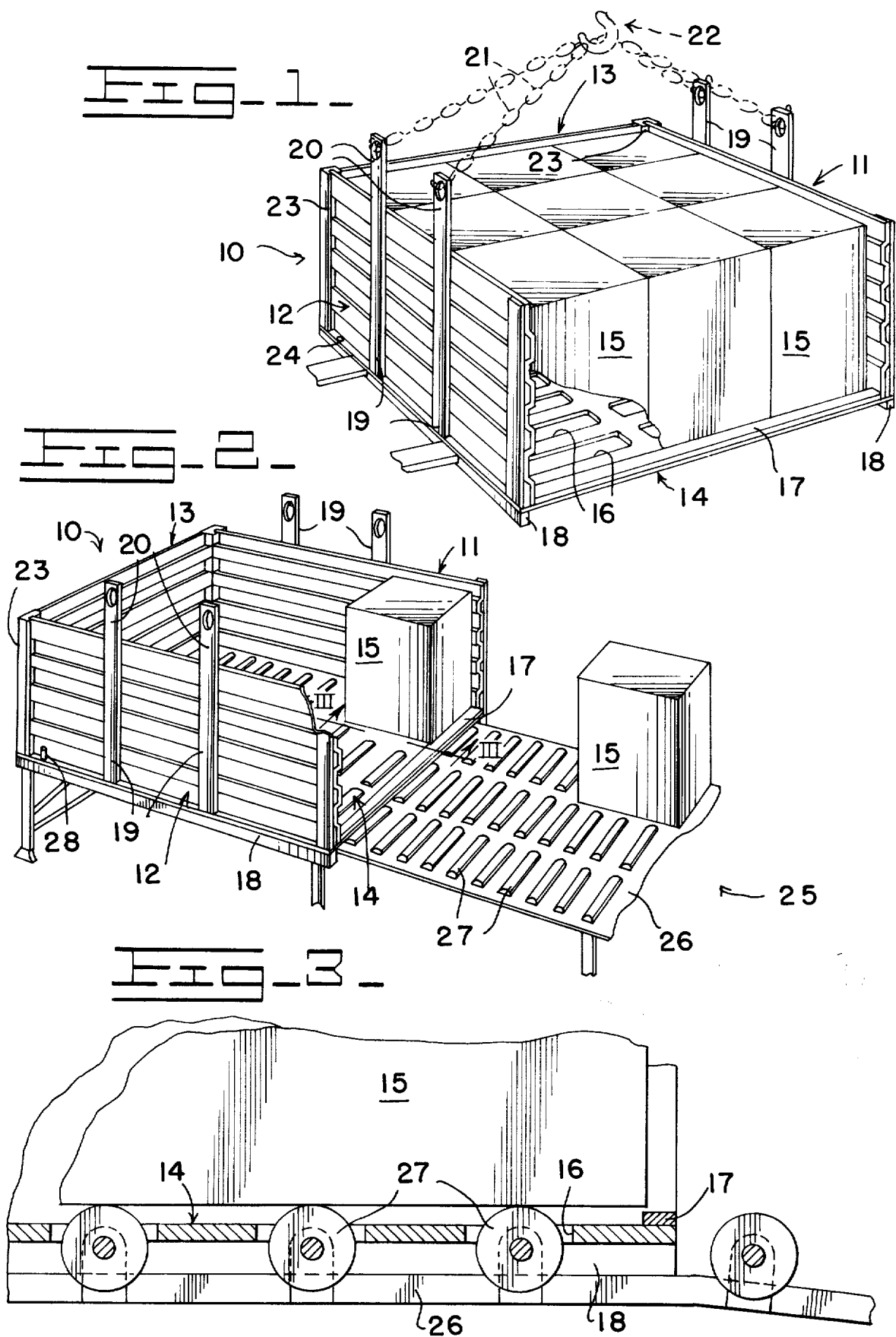

3,921,840

PORTABLE CONTAINER EMPTYING APPARATUS

BACKGROUND OF THE INVENTION

Large castings and the like are normally transported from a foundry to a machine shop by placing the castings on a flat, positioning a divider on the castings and by unitizing them together. The unit is then placed on a trailer or similar conveyance to transport it to a machine shop where the unit is separated and the castings are placed on a conveyer for machining purposes. Such a procedure is time consuming and laborious.

SUMMARY OF THIS INVENTION

An object of this invention is to provide a noncomplex and economical container and method adapted to expeditiously and efficiently transport and discharge articles onto a conveyor. The container comprises a horizontally disposed bottom wall having a plurality of upstanding sidewalls attached thereon and a plurality of elongated openings formed through the bottom wall adapted to receive a support roller therein. In use, the articles are deposited in the container and transported to a work area whereat the bottom wall is mounted on a support having a plurality of rollers mounted thereon. The rollers are arranged to project through the openings of the bottom wall to support the articles. The articles may then be rolled-out of the container, through an open side thereof.

BRIEF DESCRIPTION OF THE DRAWINGS

Further objects of this invention will become apparent from the following description and accompanying drawings wherein:

FIG. 1 is a front, isometric view of a container embodying this invention, with the container being shown in a transport condition of operation;

FIG. 2 is a somewhat similar view of the container, but showing it in a discharge condition of operation; and FIG. 3 is an enlarged sectional view taken in the direction of arrows III—III in FIG. 2.

DETAILED DESCRIPTION

FIG. 1 illustrates a shipping and storage container 10 having a pair of upstanding and parallel sidewalls 11 and 12, an upstanding back wall 13 and a horizontally disposed bottom wall attached thereto. The container is open at its top and front side and is adapted to retain a plurality of articles 15 therein, such as packaged castings. A plurality of elongated, rectangular openings 16 are formed through the bottom wall and a stop means or rail 17 is secured on a forward end of the bottom wall to extend at least substantially entirely between the sidewalls.

A pair of support and positioning rails 18 are secured below the bottom wall, beneath the sidewalls, for purposes hereinafter explained. A pair of upstanding carrying means or side members 19 are secured to each sidewall and each terminate at an upper end thereof at an opening 20 adapted to receive a chain 21 of a carrier or chain hoist 22 (partially shown) therein. An upstanding corner post 23 is secured between the back wall and a rearward end of each respective sidewall and has a bore 24 formed completely through the longitudinal length thereof.

METHOD OF OPERATION

In use, container 10 is loaded with packaged castings 15 at a foundry and then transferred to a carrier by chain hoist 22 for transport to a storage or receiving area. When it is desired to remove the castings from the container for machining purposes, the container is mounted on an unloading platform 25 for this purpose. The platform comprises a platen 26 having a plurality of rollers 27 rotatably mounted thereon (FIG. 3) and arranged so that a roller projects upwardly through each opening 16 to a position above bottom wall 14 and slightly higher than the vertical height of stop rail 17.

Rails 18 aid in precisely positioning the container on a frame of the unloading platform in that such rails straddle platten 26. In addition, a locating rod 28 may be inserted through an aperature 24 in each rail of the container to have the lower end of the rod engage a like-shaped opening (not shown) formed in the frame of the loading platform. Rails 18, rollers 27 and rods 28 thus precisely locate the container on the unloading platform to prevent lateral movements thereof during the unloading operation. Upon complete unloading of the articles from the container and onto the portion of the platform extending outwardly therefrom, the empty container may be removed from the unloading platform and a filled container substituted in lieu thereof for further unloading purposes.

Although the rollers and aligned openings 16 are shown to comprise at least two and preferably three parallel rows extending substantially the full length and width of bottom wall 14 of the container, it should be understood that the rollers and mating openings may be arrayed differently. However, in the majority of unloading operations it is desirable to provide substantially full roller support for articles 15 to assure expeditious and efficient unloading thereof. It should be further understood that an openable or removable gate (not shown) could be mounted on the open, front side of the container during transportation and/or storage thereof.

We claim:

1. A container comprising a horizontally disposed bottom wall, an upstanding back wall attached on said bottom wall, a pair of upstanding and parallel sidewalls attached on said bottom wall, means defining at least two parallel rows of elongated openings through said bottom wall with the openings of each row being disposed in aligned relationship, a platform supporting said container and at least two parallel rows of roller means extending beyond the bottom wall of said container when the container is positioned on said platform, each of said roller means rotatably mounted independently on said platform and each projecting upwardly through a respective one of said elongated openings and vertically above a top surface of said bottom wall whereby articles supported on respective rows of said roller means can be moved thereon independently, alignment means cooperating between said container and said platform for locating each of said roller means in a respective one of said elongated openings, stop means secured on and extending above a forward end of said bottom wall, adjacent to the front open side of said container, having a vertical height less than the vertical height of the portion of each of said roller means projecting vertically above the top surface of said bottom wall and carrying means secured on said container adapted for engagement with a carrier for selectively removing said container from said platform.

2. The container of claim 1 wherein said container is open at a top and front side thereof.

3. The container of claim 2 wherein three rows of said elongated openings are formed through said bottom wall in parallel relationship and extend between said sidewalls.

4. The container of claim 3 wherein each of said rows extends substantially the full length of said bottom wall, between said back wall and the front open side of said container.

5. The container of claim 4 wherein said rows further extend laterally substantially the full width of said bottom wall between said sidewalls, each of said openings being rectangular.

6. The container of claim 1 wherein said stop means constitutes a rail extending at least substantially entirely between said sidewalls.

7. The container of claim 1 further comprising a pair of laterally spaced support rails secured under said bottom wall.

8. The container of claim 7 wherein each support rail is disposed vertically below a respective sidewall.

9. The container of claim 7 wherein said alignment means comprises aligned apertures formed in each of said support rails and said platform and receiving a locating rod therein.

10. The container of claim 1 wherein said carrying means comprises at least one upstanding member secured on each of said sidewalls to extend thereabove and an opening formed through an upper end of each of said members adapted to be engaged by a carrier.

11. The container of claim 1 wherein said roller means are rotatably mounted on said platform to have their rotational axes disposed in parallel relationship and extending longitudinally between said sidewalls.

12. The container of claim 11 wherein said rows of roller means extend substantially the full length of said bottom wall, between said back wall and the front side of said container.

13. The container of claim 12 wherein said rows of roller means further extend substantially the full width of said bottom wall, between said sidewalls.

* * * * *